US006312799B1

United States Patent
Hosokawa et al.

(10) Patent No.: US 6,312,799 B1
(45) Date of Patent: Nov. 6, 2001

(54) PRESSURE-SENSITIVE ACRYLIC ADHESIVE COMPOSITION FOR ADHESION OF POLYESTER FILM AND ADHESIVE SHEETS THEREOF

(75) Inventors: Kazuhito Hosokawa; Masahiro Ohura, both of Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/552,718

(22) Filed: Apr. 19, 2000

(30) Foreign Application Priority Data

Apr. 20, 1999 (JP) .................................................. 11-111603

(51) Int. Cl.[7] .................................................... B32B 15/04
(52) U.S. Cl. ................................. 428/345; 428/355 AC; 428/423.7; 428/483; 428/500; 428/40.1; 428/41.5; 522/182; 522/173; 522/175; 522/121; 526/328; 526/328.5; 526/329.3
(58) Field of Search ..................................... 522/182, 173, 522/175, 114, 121; 428/423.7, 483, 500, 355 R, 345, 355 EN, 355 AC, 40.1, 41.5; 526/328, 328.5, 329.3

(56) References Cited

U.S. PATENT DOCUMENTS

| | | | |
|---|---|---|---|
| 4,568,602 | * | 2/1986 | Stow . |
| 5,086,088 | | 2/1992 | Kitano et al. . |
| 5,326,605 | * | 7/1994 | Ono et al. . |
| 5,466,723 | * | 11/1995 | Dotson . |
| 5,852,119 | * | 12/1998 | Kojima et al. . |
| 6,086,994 | * | 7/2000 | Oura et al. . |
| 6,162,319 | * | 12/2000 | Ohura et al. . |
| 6,211,261 | * | 4/2001 | Hosokawa et al. . |

FOREIGN PATENT DOCUMENTS

A-3-44592 7/1991 (JP) .
A-3-45115 7/1991 (JP) .

* cited by examiner

*Primary Examiner*—Susan Berman
(74) *Attorney, Agent, or Firm*—Sughrue, Mion, Zinn, Macpeak & Seas, PLLC

(57) ABSTRACT

The present invention provides a pressure-sensitive acrylic adhesive composition which is excellent in the adhesion to polyester films as an adhesive material having tackiness at ordinary temperature and has such high heat resistance as withstanding solder reflow during mounting. The pressure-sensitive acrylic adhesive composition for adhesion of polyester films comprises a tacky copolymer of a monomer mixture comprising: a) from 40 to 80% by weight of a (meth)acrylate represented by the following formula (I):

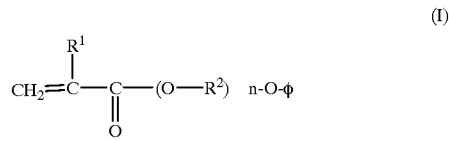

wherein $R^1$ represents a hydrogen atom or a methyl group; $R^2$ represents a methylene group, an ethylene group or a propylene group; n is an integer of 1 to 3; and φ represents a phenyl group, a monoalkyl-substituted phenyl group or a dialkyl-substituted phenyl group; b) from 19 to 40% by weight of an alkyl (meth)acrylate carrying an alkyl group having 2 to 14 carbon atoms on average which is copolymerizable with said monomer component a); and c) from 1 to 20% by weight of another monoethylenic unsaturated monomer which is copolymerizable with said monomer components a) and b), each based on the monomer mixture.

10 Claims, No Drawings

PRESSURE-SENSITIVE ACRYLIC ADHESIVE COMPOSITION FOR ADHESION OF POLYESTER FILM AND ADHESIVE SHEETS THEREOF

FIELD OF THE INVENTION

This invention relates to a pressure-sensitive acrylic adhesive composition for adhesion of a polyester film and adhesive sheets in the form of sheets, tapes or the like containing the same.

BACKGROUND OF THE INVENTION

In recent years, various plastic materials have been used in, for example, electronic parts.

In these fields with the need for particularly high heat resistant reliability, heat resistant films such as polyimide films and polyether imide films are mainly employed and heat-curing adhesives are employed in adhesion of these films. In the fields where the necessity for high heat resistant reliability is not so strict, there have been employed polyester films and pressure-sensitive adhesives for adhesion of the same.

The pressure-sensitive adhesive provided with a release paper is bonded as such to electronic parts or the like and then subjected to a mounting step such as solder reflow, and after the release paper is peeled, the pressure-sensitive adhesive is adhered to a polyester film. In such a case, it is required that these pressure-sensitive adhesives have a high heat resistance almost comparable to the level of heat-curing adhesives, as well as strong adhesion to a polyester film.

There are various pressure-sensitive adhesives showing tackiness at ordinary temperature. Also, various pressure-sensitive acrylic adhesives are known as being usable in adhesion of electronic parts. Pressure-sensitive acrylic adhesives usually contain, as the main component, a tacky copolymer of a monomer mixture which is composed of an alkyl (meth)acrylate carrying an alkyl group having 2 to 14 carbon atoms on average as the main component together with a monoethylenic unsaturated monomer such as acrylic acid.

Although these pressure-sensitive acrylic adhesives show heat resistance of a certain extent, they are poor in the adhesive strength to polyester films and thus sometimes cause troubles such as peeling. When tackifier resins commonly employed in the art are added thereto to improve the adhesive strength to polyester films, these adhesives are softened and fluidized in the step of solder reflow, which makes them unusable.

SUMMARY OF THE INVENTION

Under these circumstances, the invention aims at providing a highly heat-resistant pressure-sensitive acrylic adhesive composition and adhesive sheets with the use of the same which are excellent in the adhesion to polyester films as adhesive materials having tackiness at ordinary temperature and being usable in adhesion of polyester films in the fields of, for example, electronic parts and have such high heat resistance as withstanding solder reflow during mounting.

In the course of intensive studies to achieve the object as described above, the inventors have found that the use of an alkyl (meth)acrylate carrying an alkyl group having 2 to 14 carbon atoms on average as the main component results in an acrylic copolymer exhibiting poor adhesion to a polyester film, even if it is copolymerized with any monoethylenic unsaturated monomer as a component for improving the cohesive force, and that even if any tackifier resin for improving its adhesion is added, it is hardly possible to prevent the thus obtained acrylic copolymer from softening/fluidization due to the heat in the step of solder reflow.

Based on these findings, the inventors have conducted further studies and, as a result, found that it is possible to obtain a pressure-sensitive acrylic adhesive composition and adhesive sheets thereof, which are excellent in flexibility, softness and cohesiveness and show, as adhesive materials, excellent adhesion to polyester films without undergoing softening or fluidization due to the heat in the step of solder reflow, can be obtained by using as the main component an acrylic monomer with a specific molecular structure, which exhibits as the homopolymer per se a large cohesive force and a high heat resistance and, at the same time, shows excellent adhesion to polyester films, as a substitute for an alkyl (meth)acrylate carrying an alkyl group having 2 to 14 carbon atoms on average, and further copolymerizing the acrylic monomer with appropriate amounts of the alkyl (meth)acrylate as described above for exhibiting adhesion and another monomer component for further improving the heat resistance and adhesion, thereby completing the invention.

Accordingly, the invention relates to a pressure-sensitive acrylic adhesive composition for adhesion of polyester films which comprises a tacky copolymer of a monomer mixture comprising:

a) from 40 to 80% by weight of a (meth)acrylate represented by the following formula (I):

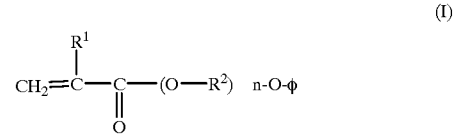

wherein $R^1$ represents a hydrogen atom or a methyl group; $R^2$ represents a methylene group, an ethylene group or a propylene group; n is an integer of 1 to 3; and $\phi$ represents a phenyl group, a monoalkyl-substituted phenyl group or a dialkyl-substituted phenyl group;

b) from 19 to 40% by weight of an alkyl (meth)acrylate carrying an alkyl group having 2 to 14 carbon atoms on average which is copolymerizable with the monomer component a); and c) from 1 to 20% by weight of another monoethylenic unsaturated monomer which is copolymerizable with the monomer components a) and b), each based on the monomer mixture.

More particularly, the invention relates to the pressure-sensitive acrylic adhesive composition for adhesion of polyester films of the constitution as described above, wherein the tacky copolymer is one obtained by the irradiation with radiation such as ultraviolet rays. Furthermore, the invention also relates to adhesive sheets for adhesion of polyester films which have at least one layer made of the pressure-sensitive acrylic adhesive composition described above on one or both sides of a base material.

DETAILED DESCRIPTION OF THE INVENTION

The monomer component a) to be used in the invention is a (meth)acrylate represented by formula (I). In formula (I), when $\phi$ is a monoalkyl-substituted phenyl group or a dialkyl-substituted phenyl group, the alkyl group as the substituent for the phenyl group generally has from 1 to 5 carbon atoms. When n is 2 or 3, the plural $R_2$ may be the same or different. Since the homopolymer thereof shows a high glass transition temperature (Tg), the component a) contributes to the improvement in the heat resistance of the copolymer and exerts favorable effects on the adhesion thereof to polyester films. More particularly speaking, examples thereof include phenoxyethyl (meth)acrylate, phenoxypropyl (meth) acrylate, nonylphenoxyethyl (meth)acrylate and nonylphenoxypropyl (meth)acrylate. It is also preferable to use therefor (meth)acrylates of ethylene oxide adducts or propylene oxide adducts (addition mole number: up to 3) of phenol, cresol or nonylphenol. Either one of these monomers or a mixture of two or more thereof may be used.

The monomer component b) to be used in the invention is an alkyl (meth)acrylate carrying an alkyl group having 2 to 14 carbon atoms on average which is copolymerizable with the monomer component a). This component is employed in order to impart tackiness to the copolymer. Particular examples thereof include ethyl (meth)acrylate, butyl (meth) acrylate, isoamyl (meth)acrylate, n-hexyl (meth)acrylate, 2-ethylhexyl (meth)acrylate, isooctyl (meth)acrylate, isononyl (meth)acrylate, decyl (meth)acrylate and dodecyl (meth)acrylate. Either one of these monomers or a mixture of two or more thereof may be used.

The monomer component c) to be used in the invention is a monoethylenic unsaturated monomer which is copolymerizable with the monomer components a) and b). This component is employed in order to further improve the heat resistance or the adhesion of the copolymer by introducing functional groups or polar groups thereinto. Particular examples thereof include (meth)acrylic acid, hydroxyalkyl (meth)acrylates, cyanoalkyl (meth)acrylates, (meth) acrylamide, substituted (meth)acrylamide, N-vinylcaprolactam, (meth)acrylonitrile, 2-methoxyethyl (meth)acrylate, glycidyl (meth)acrylate and vinyl acetate. Either one of these monomers or a mixture of two or more thereof may be used.

A monomer mixture composed of these three components a) to c) is used in the invention. Regarding the ratio of these components, it is preferable that the content of the (meth) acrylate used as the component a) (i.e., the main component) ranges from 40 to 80% by weight, preferably from 55 to 75% by weight, the content of the alkyl (meth)acrylate used as the component b) ranges from 19 to 40% by weight, preferably from 20 to 30% by weight, and the content of the monoethylenic unsaturated monomer used as the component c) ranges from 1 to 20% by weight, preferably from 5 to 15% by weight, each based on the monomer mixture. When the content of the (meth)acrylate used as the component a) is less than 40% by weight, the heat resistance is lowered and the adhesion to polyester films is deteriorated. When the content of the (meth)acrylate used as the component a) exceeds 80% by weight or the content of the alkyl (meth) acrylate used as the component b) is less than 19% by weight, the resultant copolymer fails to exhibit tackiness at ordinary temperature. When the content of the alkyl (meth) acrylate used as the component b) exceeds 40% by weight or the content of the monoethylenic unsaturated monomer used as the component c) is less than 1% by weight, the heat resistance and the adhesion are liable to be lowered.

In the invention, the monomer mixture as described above is copolymerized to give a tacky copolymer. The copolymerization can be carried out by using an appropriate polymerization method such as solution polymerization, emulsion polymerization, bulk polymerization or a combination thereof. In the copolymerization, use can be made of heat polymerization initiators and photopolymerization initiators as polymerization catalysts. It is also possible to use potassium persulfate, ammonium persulfate, hydrogen peroxide and redox initiators consisting of these compounds with reducing agents.

Among the polymerization methods as described above, it is most desirable to use the bulk polymerization method which comprises effecting the polymerization with irradiation of radiation such as ultraviolet rays or electron beams. This method is free from any fear of corrosion of electronic parts due to remaining organic solvents, inflation caused by expansion due to vaporization at high temperature, peeling, slip, contamination caused by bleeding of emulsifiers, adhesion failure, or deterioration in moisture resistance. Moreover, the molecular weight of the copolymer can be elevated by irradiating with, for example, ultraviolet rays of a relatively small intensity and thus an excellent tacky polymer having a high degree of crosslinkage and a large cohesive force can be obtained. The irradiation is generally effected such that a rate of polymerization of the composition is 90% or more. The rate of polymerization can be obtained by the following equation: (weight of the resulting polymerized product after heating at 130° C. for 2 hours/ weight of the same before heating)×100 (%).

The pressure-sensitive acrylic adhesive composition according to the invention, which contains the tacky copolymer obtained above as the essential component, may further contain arbitrary components selected from among publicly known additives such as tackifiers, plasticizers, softeners, fillers, pigments, dyes and aging inhibitors. The total amount of these additives is generally 30 parts by weight or less based on 100 parts by weight of the monomer mixture.

To improve the holding properties of the adhesive, it is also possible to use therein crossing agents such as known crosslinking agents (for example, isocyanate compounds, epoxy compounds). In case of effecting photopolymerization, moreover, it is possible to add polyfunctional (meth)acrylates such as trimethylolpropane tri (meth)acrylate, pentaerythritol tetra(meth)acrylate, 1,2-ethylene glycol di(meth)acrylate and 1,6-hexanedion di(meth)acrylate. The crossing agent or polyfunctional (meth)acrylates can be employed usually in an amount of from 0.05 to 5 parts by weight, preferably from 0.1 to 3 parts by weight, per 100 parts by weight of the monomer mixture as described above. With regard to the polyfunctional (meth) acrylates, it is recommended that a bifunctional compound is used in a somewhat large amount while a trifunctional or higher compound is used in a somewhat small amount, each within the range as defined above. When the content of such an additive is less than 0.05 parts by weight, a sufficiently high degree of crosslinkage cannot be sustained after the completion of the copolymerization and, as a result, there frequently arises deterioration in the holding properties. When the content thereof exceeds 5 parts by weight, on the contrary, the modulus of elasticity is extremely elevated, which frequently induces deterioration in adhesion (for example, adhesion failure).

The adhesive sheets according to the invention are in the form of sheets or tapes wherein layer(s) made of the pressure-sensitive acrylic adhesive composition containing the tacky copolymer as described above are formed on one or both sides of a base material. These layers can be formed by preparing the tacky copolymer By an appropriate method, adding, for example, a crosslinking agent thereto to give a pressure-sensitive acrylic adhesive composition, then applying the composition on the base material and crosslinking, if necessary, by, for example, heating. In a preferable case, a polyfunctional (meth)acrylate is added to the monomer mixture before polymerization or subjected to partial polymerization, to obtain a radiation-polymerizable composition and then the composition is applied onto a base material, followed by copolymerization via the irradiation with radiation such as ultraviolet rays, whereby the tacky copolymer is synthesized and the layer is formed at the same time. According to this method, favorable results can be achieved owing to the heat resistance of the adhesive.

As the base material, use can be made of non-releasing base materials such as synthetic resin films (for example, polyester films) and fiber base materials and releasing base materials such as release paper. In the case of the releasing base materials, the layer made of the pressure-sensitive acrylic adhesive composition formed thereon may be finally transferred onto a non-releasing base material. The adhesive sheets according to the invention involve those with the use of non-releasing base materials as well as those with the use of releasing base materials.

The pressure-sensitive acrylic adhesive composition and adhesive sheets according to the invention can be advantageously used as adhesive materials for adhesion of polyester films in the fields of electronic parts or the like, since they are excellent in flexibility, softness and cohesiveness and show excellent adhesion to polyester films and such high heat resistance as withstanding solder reflow in the step of mounting.

EXAMPLES

Now, the invention will be described in greater detail by reference to the following Examples wherein all parts are by weight.

Example 1

Into a reactor provided with a cooling tube, a nitrogen-introducing tube, a thermometer and a stirrer, 210 parts of ethyl acetate employed as a solvent, 70 parts of phenoxyethyl acrylate, 29 parts of butyl acrylate, 1 part of acrylic acid and 0.3 parts of benzoyl peroxide were introduced and polymerized in a nitrogen gas stream to give a solution of a tacky copolymer having a solid content of about 30% by weight. This solution was uniformly mixed with 3 parts, per 100 parts of the solid matter in the solution, of a polyfunctional isocyanate crosslinking agent to thereby prepare a solution of a pressure-sensitive acrylic adhesive composition. Next, this solution was applied onto a separator and dried at 130° C. for 5 minutes to thereby form an adhesive layer having a thickness of 50 μm. Thus, an adhesive sheet was produced.

Example 2

Into a four-necked flask, 70 parts of phenoxyethyl acrylate, 20 parts of butyl acrylate, 10 parts of acryloylmorpholine and 0.05 parts of 2,2-dimethoxy-2-phenylacetophenone were charged and then partly photopolymerized by exposing to ultraviolet rays in a nitrogen atmosphere to give a syrup having a viscosity of about 30 P. 100 parts of the thus partly polymerized syrup was uniformly mixed with 0.3 parts of 1,6-hexanediol diacrylate employed as a crosslinking agent to thereby give a photopolymerizable composition. Next, this composition was applied onto a separator and photopolymerized by irradiating with ultraviolet rays at 900 mj/cm² to thereby form a layer compoesed of the pressure-sensitive acrylic adhesive composition having a thickness of 50 μm. Thus, an adhesive sheet was produced.

Example 3

A layer made of a pressure-sensitive acrylic adhesive composition having a thickness of 50 μm was formed in the same manner as in Example 2 except for using 70 parts of an ester of an ethylene oxide adduct (addition mole number: 1) of cresol with acrylic acid in place of 70 parts of phenoxyethyl acrylate. Thus, an adhesive sheet was produced.

Comparative Example 1

Into a reactor provided with a cooling tube, a nitrogen-introducing tube, a thermometer and a stirrer, 210 parts of ethyl acetate employed as a solvent, 90 parts of butyl acrylate, 10 parts of acrylic acid and 0.3 parts of benzoyl peroxide were introduced and polymerized in a nitrogen gas stream to give a solution of an acrylic copolymer having a solid content of about 30% by weight. This solution was uniformly mixed with 3 parts, per 100 parts of the solid matter in the solution, of a polyfunctional isocyanate crosslinking agent to thereby prepare a solution of a pressure-sensitive acrylic adhesive composition. Next, this solution was applied onto a separator and dried at 130° C. for 5 minutes to thereby form an adhesive layer having a thickness of 50 μm. Thus, an adhesive sheet was produced.

Comparative Example 2

Into a four-necked flask, 90 parts of isooctyl acrylate, 10 parts of acrylic acid and 0.05 parts of 2,2-dimethoxy-2-phenylacetophenone were charged and then partly photopolymerized by exposing to ultraviolet rays in a nitrogen atmosphere to give a syrup having a viscosity of about 30 P. 100 parts of the thus partly polymerized syrup was uniformly mixed with 0.3 parts of 1,6-hexanediol diacrylate employed as a crosslinking agent to thereby give a photopolymerizable composition. Next, this composition was applied onto a separator and photopolymerized by irradiating with ultraviolet rays at 900 mj/cm² to thereby form a layer made of the pressure-sensitive acrylic adhesive composition having a thickness of 50 μm. Thus, an adhesive sheet was produced.

Comparative Example 3

Into a four-necked flask, 90 parts of isooctyl acrylate, 10 parts of acrylic acid and 0.05 parts of 2,2-dimethoxy-2-phenylacetophenone were charged and then partly photopolymerized by exposing to ultraviolet rays in a nitrogen atmosphere to give a syrup having a viscosity of about 30 P. 100 parts of the thus partly polymerized syrup was uniformly mixed with 0.3 parts of 1,6-hexanediol diacrylate employed as a crosslinking agent and 20 parts of a terpenephenol resin (SUMILITE RESIN™ PR-12603 manufactured by Sumitomo Deyuresu) employed as a tackifier to thereby give a photopolymerizable composition. Next, this composition was applied onto a separator and photopolymerized by irradiating with ultraviolet rays at 900 mj/cm² to thereby form a layer made of the pressure-sensitive acrylic adhesive composition having a thickness of 50 μm. Thus, an adhesive sheet was produced.

Comparative Example 4

Into a four-necked flask, 30 parts of phenoxyethyl acrylate, 50 parts of butyl acrylate, 10 parts of acryloylmorpholine, 10 parts of acrylic acid and 0.05 parts of 2,2-dimethoxy-2-phenylacetophenone were charged and then partly photopolymerized by exposing to ultraviolet rays in a nitrogen atmosphere to give a syrup having a viscosity of about 30 P. 100 parts of the thus partly polymerized syrup was uniformly mixed with 0.3 parts of 1,6-hexanediol diacrylate employed as a crosslinking agent to thereby give a photopolymerizable composition. Next, this composition was applied onto a separator and photopolymerized by irradiating with ultraviolet rays at 900 mj/cm$^2$ to thereby form a layer made of the pressure-sensitive acrylic adhesive composition having a thickness of 50 μm. Thus, an adhesive sheet was produced.

Comparative Example 5

Into a four-necked flask, 85 parts of phenoxyethyl acrylate, 10 parts of butyl acrylate, 5 parts of acrylic acid and 0.05 parts of 2,2-dimethoxy-2-phenylacetophenone were charged and then partly photopolymerized by exposing to ultraviolet rays in a nitrogen atmosphere to give a syrup having a viscosity of about 30 P. 100 parts of the thus partly polymerized syrup was uniformly mixed with 0.3 parts of 1,6-hexanediol diacrylate employed as a crosslinking agent to thereby give a photopolymerizable composition. Next, this composition was applied onto a separator and photopolymerized by irradiating with ultraviolet rays at 900 mj/cm$^2$ to thereby form a layer made of the pressure-sensitive acrylic adhesive composition having a thickness of 50 μm. Thus, an adhesive sheet was produced.

Each of the adhesive sheets of Examples 1 to 3 and Comparative Examples 1 to 5 was examined in the 180° peel adhesive strength, holding force and solder heat resistance by the following methods. Table 1 summarizes the results.

180° Peel Adhesive Strength Test

An adhesive sheet (20 mm in width, 50 mm in length) was bonded to a polyethylene terephthalate film (hereinafter referred to as a PET film) having a thickness of 25 μm with a hand roller and then bonded further to an adherend (a PET film of 188 μm in thickness) under moving a 2 kg roller back and forth once. The thus obtained sample was allowed to stand at 23° C. under 65% RH for 30 minutes and then pulled in a direction at an angle of 180° at a speed of 300 mm/min. The median was referred to as the 180° peel adhesive strength.

Holding Force

An adhesive sheet piece (15 mm×15 mm) was used to bond one end of an aluminum piece (25 mm in width and 50 mm in length) and one end of another aluminum piece having the same size by moving a 5 kg roller back and forth once such that the other ends of each aluminum piece do not face each other, namely, the portions other than the adhered ends do not overlap with each other. Thus, a test piece was prepared. After allowing to stand in an atmosphere at 80° C. for 30 minutes, the test piece was suspended in the lengthwise direction by fixing one end of the test piece and a weight (1 kg) was loaded upon the other end of the test piece in an atmosphere at 80° C. After 2 hours, the slip distance was measured. In a case where the test piece dropped, the time until dropping was measured.

Solder Heat Resistance

An adhesive sheet was bonded to a polyimide film of 75 μm in thickness with a laminator (temperature: 100° C., pressure: 5 kg/cm, speed: 2 m/min) and cut into pieces (50 mm×50mm). After peeling off the separator, the sample was floated on a bath of molten solder at 260° C. with the adhesive layer side upward for 60 seconds. After the completion of this treatment, the adhesive layer surface conditions were observed with the naked eye to evaluate foaming and fluidization of the adhesive layer in two grades, i.e., showing no change/abnormality (A) and suffering from change/abnormality (B).

TABLE 1

| | 180° Peel Adhesive Strength (g/20 mm width) | Holding Force (slip: mm) | Solder Heat Resistance |
|---|---|---|---|
| Ex. 1 | 1,600 | 1.2 | A |
| Ex. 2 | 1,700 | 0.1 | A |
| Ex. 3 | 1,400 | 0.7 | A |
| C. Ex. 1 | 800 | 0.1 | A |
| C. Ex. 2 | 900 | 0.1 | A |
| C. Ex. 3 | 1,600 | dropping (1 min) | B |
| C. Ex. 4 | 700 | dropping (1 min) | B |
| C. Ex. 5 | 30 | 0 | A |

As the results given in the above Table 1 show, the adhesive sheets of Examples 1 to 3 according to the invention are excellent in the adhesive strength, holding force (cohesive force) and solder heat resistance. In contrast thereto, the adhesive sheets of Comparative Examples 1 and 2, wherein alkyl (meth)acrylate was used as the main component in the synthesis of the acrylic copolymer, each show a satisfactory holding force and heat resistance but an insufficient adhesion to the polyester film. The adhesive sheet of Comparative Example 3, wherein the tackifier resin was added to the conventional acrylic copolymer, shows an improved adhesion but suffers from extreme deterioration in the holding force and heat resistance. Thus, it is unusable in adhesion of polyester films in the field of, for example, electronic parts. Further, the adhesive sheet of Comparative Example 4, wherein phenoxyethyl acrylate was used only in an insufficient amount, shows an insufficient adhesion to the polyester film and a poor holding force and heat resistance. The adhesive sheet of Comparative Example 5, wherein phenoxyethyl acrylate was used in an excessive amount, fails to exhibit adhesion at ordinary temperature.

According to the invention, it is possible as described above to provide a pressure-sensitive acrylic adhesive composition and adhesive sheets thereof which show largely improved adhesion to polyester films without deteriorating the heat resistance as adhesive materials showing adhesion at ordinary temperature by using as the main component an acrylic monomer with a specific molecular structure, which exhibits as the homopolymer per se a large cohesive force and a high heat resistance and, at the same time, shows excellent adhesion to polyester films, together with appropriate amounts of a commonly employed alkyl (meth) acrylate for exhibiting the takiness and another monomer component for further improving the heat resistance and adhesion.

While the invention has been described in detail and with reference to specific embodiments thereof, it will be apparent to one skilled in the art that various changes and modifications can be made therein without departing from the spirit and scope thereof.

What is claimed is:

1. A pressure-sensitive acrylic adhesive composition for adhesion of polyester films which comprises a tacky copolymer of a monomer mixture comprising:

a) from 40 to 80% by weight of a (meth)acrylate represented by the following formula (I):

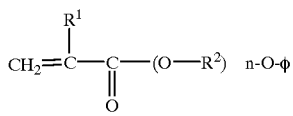

(I)

wherein $R^1$ represents a hydrogen atom or a methyl group; $R^2$ represents a methylene group, an ethylene group or a propylene group; n is an integer of 1 to 3; and φ represents a phenyl group, a monoalkyl-substituted phenyl group or a dialkyl-substituted phenyl group;

b) from 19 to 40% by weight of an alkyl (meth)acrylate carrying an alkyl group having 2 to 14 carbon atoms on average which is copolymerizable with said monomer component a); and c) from 1 to 20% by weight of another monoethylenic unsaturated monomer which is copolymerizable with said monomer components a) and b), each based on the monomer mixture.

2. The pressure-sensitive acrylic adhesive composition of claim 1, wherein said tacky copolymer is one obtained by the irradiation with radiation.

3. The pressure-sensitive acrylic adhesive composition of claim 2, wherein the radiation is ultraviolet rays.

4. The pressure-sensitive acrylic adhesive composition of claim 1, wherein component a) is at least one selected from the group consisting of phenoxyethyl (meth)acrylate, phenoxypropyl (meth)acrylate, nonylphenoxyethyl (meth)acrylate and nonylphenoxypropyl (meth)acrylate, (meth)acrylates of ethylene oxide adducts or propylene oxide adducts of phenol, cresol or nonylphenol.

5. The pressure-sensitive acrylic adhesive composition of claim 1, wherein component b) is at least one selected from the group consisting of ethyl (meth)acrylate, butyl (meth)acrylate, isoamyl (meth)acrylate, n-hexyl (meth)acrylate, 2-ethylhexyl (meth)acrylate, isooctyl (meth)acrylate, isononyl (meth)acrylate, decyl (meth)acrylate and dodecyl (meth)acrylate.

6. Adhesive sheet for adhesion of polyester film, which comprises a base material having provided thereon at least one layer composed of a pressure-sensitive acrylic adhesive composition which comprises a tacky copolymer of a monomer mixture comprising:

a) from 40 to 80% by weight of a (meth)acrylate represented by the following formula (I):

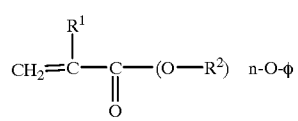

(I)

wherein $R^1$ represents a hydrogen atom or a methyl group; $R^2$ represents a methylene group, an ethylene group or a propylene group; n is an integer of 1 to 3; and φ represents a phenyl group, a monoalkyl-substituted phenyl group or a dialkyl-substituted phenyl group;

b) from 19 to 40% by weight of an alkyl (meth)acrylate carrying an alkyl group having 2 to 14 carbon atoms on average which is copolymerizable with said monomer component a); and from 1 to 20% by weight of another monoethylenic unsaturated monomer which is copolymerizable with said monomer components a) and b).

7. The adhesive sheet of claim 6, wherein said tacky copolymer is one obtained by the irradiation with radiation.

8. The adhesive sheet of claim 7, wherein the radiation is ultraviolet rays.

9. The adhesive sheet of claim 6, wherein component a) is at least one selected from the group consisting of phenoxyethyl (meth)acrylate, phenoxypropyl (meth)acrylate, nonylphenoxyethyl (meth)acrylate and nonylphenoxypropyl (meth)acrylate, (meth)acrylates of ethylene oxide adducts or propylene oxide adducts of phenol, cresol or nonylphenol.

10. The adhesive sheet of claim 6, wherein component b) is at least one selected from the group consisting of ethyl (meth)acrylate, butyl (meth)acrylate, isoamyl (meth)acrylate, n-hexyl (meth)acrylate, 2-ethylhexyl (meth)acrylate, isooctyl (meth)acrylate, isononyl (meth)acrylate, decyl (meth)acrylate and dodecyl (meth)acrylate.

* * * * *